April 7, 1970

H. A. STENNER

MEANS FOR HARNESSING NATURAL ENERGY 3,504,988

Filed May 7, 1968

INVENTOR
HERBERT A. STENNER
BY Blacock, Downing
& Seebold
ATTORNEYS

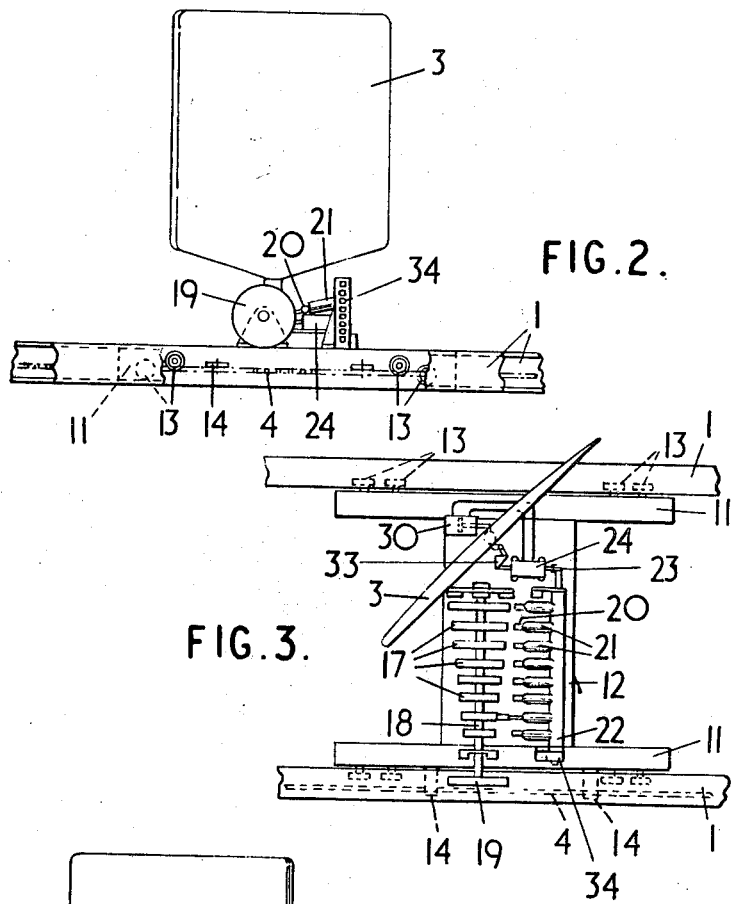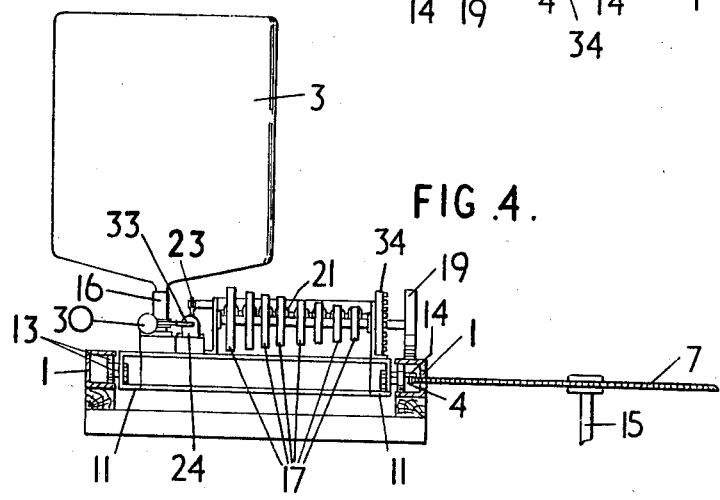

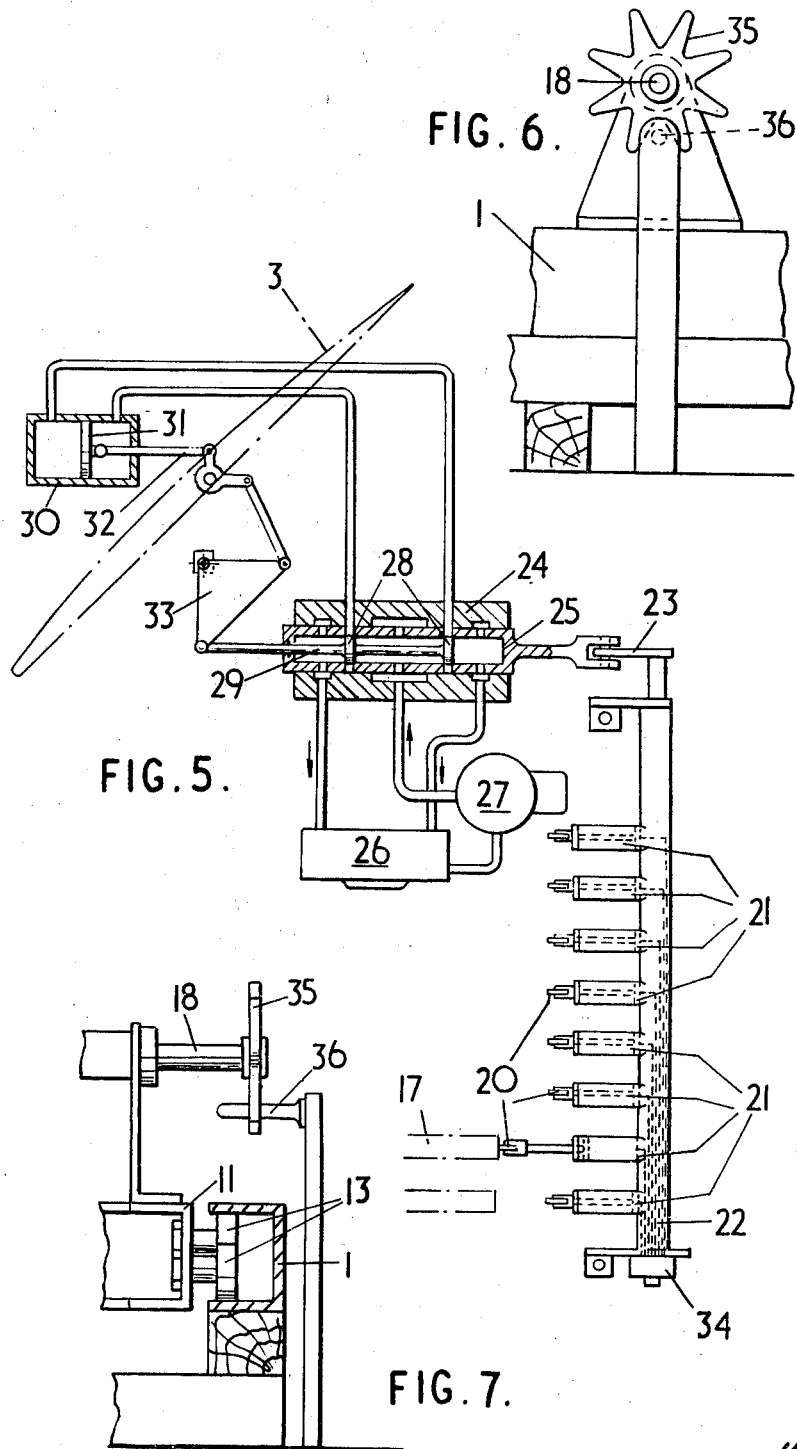

United States Patent Office 3,504,988
Patented Apr. 7, 1970

3,504,988
MEANS FOR HARNESSING NATURAL ENERGY
Herbert Alfred Stenner, 8 Lloyd Square,
Finsbury, London, E.C.1, England
Filed May 7, 1968, Ser. No. 727,255
Claims priority, application Great Britain, May 8, 1967,
21,232
Int. Cl. F03d 5/04
U.S. Cl. 416—9                                7 Claims

ABSTRACT OF THE DISCLOSURE

A device for harnessing wind energy in which an endless flexible band adapted to run around a closed circuit has a series of wind resistant devices attached thereto in such a way that impingement of air currents on the devices causes the band to travel around the closed circuit, thus driving transmission means, adapted to transmit the movement of the band to an electrical generator.

---

This invention relates to a device for harnessing natural energy and more particularly to a device for harnessing the energy of the wind.

The invention consists in a device for harnessing wind energy, which device consists of an endless flexible band adapted to run around a closed circuit, which band has a series of wind resistant devices attached thereto in such a way that impingement of air currents on the devices causes the band to travel around the closed circuit, thus driving transmission means, adapted to transmit the movement of the band to an electrical generator.

In one embodiment, the direction of travel of the band may be substantially at right angles to the wind direction.

Preferably in this case the angle which the wind resistant devices present to the direction of the wind is adjusted so that the action of the wind on the devices attached to the part of the band moving in one direction reinforces the action of the wind on the devices attached to the part of the band moving in the opposite direction. Thus a device may be provided for changing the angle of the wind-resistant sails to the direction of the wind as the band passes over pulleys or wheels at the ends of its travel. In this way a reinforcing action is produced to drive the band in a clockwise or anti-clockwise direction.

Alternatively the band may be oriented so that the wind direction is essentially parallel to the direction of travel of the band. In this case the sails may be mounted so as to be hinged through 90° so that they are driven by the wind over half of the band travel but are feathered when they reach the opposite half the band where the direction of travel is opposed to the wind direction.

Means must be provided to keep the sails and/or the line of the travel of the band at a constant angle to the direction of the wind and such devices as weather vane controlled sails may be suitable for this purpose.

In a preferred embodiment of the invention, the band is formed from a series of bogies or trolleys which are pivotally linked together and which trolleys carry masts and sails, the trolleys being adapted to run around a fixed track disposed in a substantially horizontal plane, means being provided to trim the sails so that the angle of each sail to the direction of the wind at each point of the track is adjusted to a desired angle.

In this latter embodiment each trolley may be arranged to run around a track and a hydraulically operated trimming device may be provided on each trolley to trim the sail on that unit to a desired angle to the wind. The trimming device may be actuated by means of a system of cams, cam followers and solenoids which solenoids may be actuated by means of a weather-vane type selector switch, mounted on a high mast on the center of the track and responsive to the direction of the wind.

In this arrangement a series of cams may be mounted on a common shaft which is driven by a distance wheel running on the track, so that each cam rotates once for each time the trolley makes a complete circuit of the track. The cam followers and solenoids may be mounted on a shaft so that when a particular solenoid is actuated, the action of the corresponding cam against the cam follower causes limited rotational movement of this shaft. This rotation is transmitted by way of a mechanical linkage to a sleeve sliding in a block, within which sleeve moves a piston, with the sleeve and piston forming a part of a hydraulic circuit, and the pressure on the fluid in this circuit causing alteration of the angle of the sail to the wind.

The link between the weather-vane type selector switch and the solenoids may either be a purely electrical one, using electric wires and rails or alternatively the selector switch may be used to light one of a series of lights mounted vertically above one another on a mast alongside the track, with the light causing actuation of a photoelectric cell relay, which in turn actuates the respective solenoid. As a further alternative a mechanical link may be provided between the selector switch and the solenoids.

The trolleys, mast and associated members are preferably of light-weight construction so as to give minimum resistance to the movement of the trolleys around the track. Similarly low friction bearings should be used to mount the trolley for movement around the track.

Also the trolley may run on a monorail track, instead of the dual rail track described above.

As an alternative to the distance wheel used to drive the cam-shaft, an alternative driving arrangement consisting of a spoked wheel which is actuated by a series of strikers located around the curves of the track may be used.

The invention will be further described by reference to the embodiments shown in the accompanying drawings in which:

FIGURE 2 is a view in elevation of one of the trolleys.

FIGURE 3 is a plan view of the same trolley.

FIGURE 4 is a view in elevation of a trolley from a direction at right angles to that of FIGURE 2.

FIGURE 5 is a detail view partly in elevation and partly in section of the hydraulic circuit and mechanism used to trim a sail carried by the trolley.

FIGURES 6 and 7 show alternative means of driving a camshaft forming part of the sail trimming mechanism.

Figure 1:
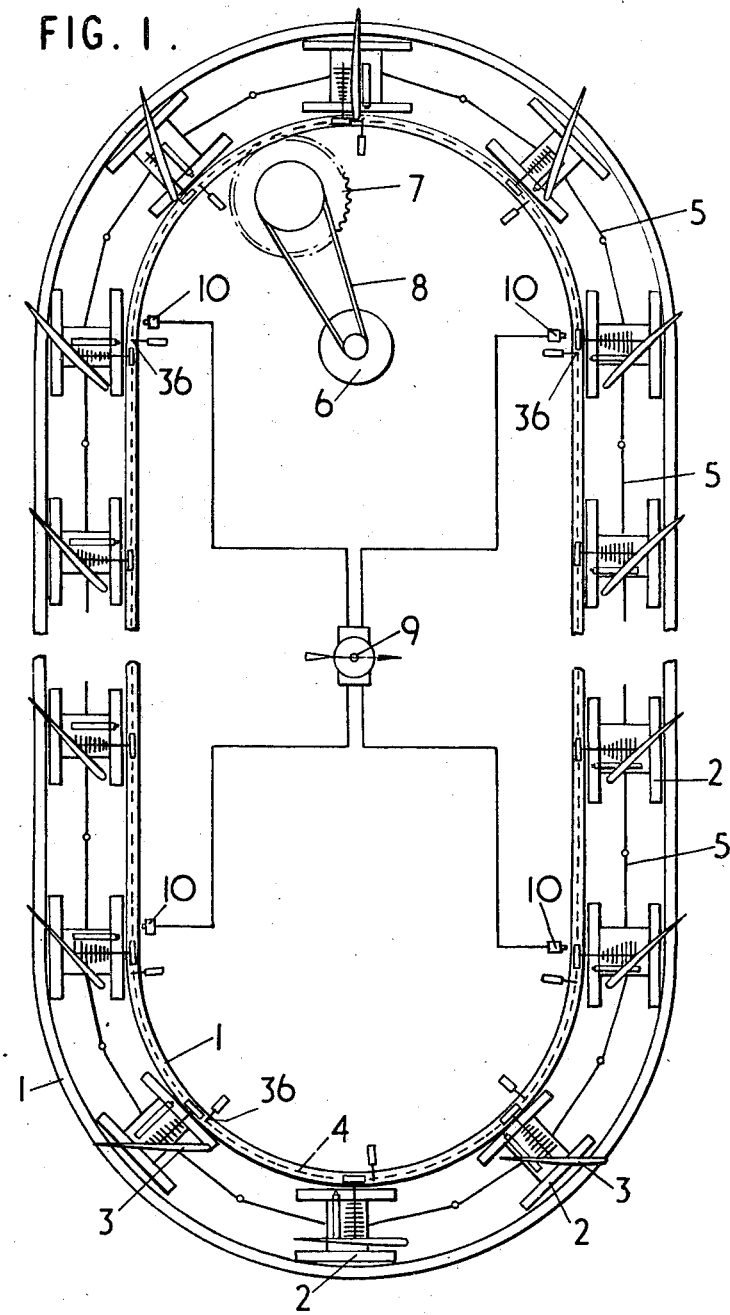
FIGURE 1 is a plan view of a wind harnessing device according to the invention in the form of a track having a number of trolleys mounted thereon, with each trolley carrying a sail.

With reference to FIGURE 1, the wind-harnessing device consists of a double track 1, upon which are located a series of trolleys 2 having sails 3 mounted on masts thereon. A chain 4 attached to the trolleys is driven around the inner periphery of the track by the movement of the trolleys, and this chain is designated by the chain-dotted line in FIGURE 1. The trolleys 2 are linked together by means of pivotable links 5. The chain 4, driven by the trolleys is used to transmit the drive to an electrical generator 6 via a sprocket wheel 7 and a belt-drive 8.

Various gearing arrangements may, of course, be interposed between the chain drive 4 and the generator 6. In the center of the track is mounted a weather-vane type selector switch 9 which is responsive to the direction of the wind and mounted on a high mast so as to be above the level of the sails 3 and other ancillary parts of the trolley track system. This switch 9 is connected to a series of trigger-points 10 which are adapted to give a signal corresponding to the wind direction and to transmit this signal to the trolley thus causing appropriate orientation of the sail angle to the wind direction in a manner to be further described in detail subsequently.

With reference to FIGURES 2, 3 and 4, a trolley 3 consists of a pair of side members 11 connected by a connecting framework 12.

The trolley is mounted on the track by means of wheels 13 which run within the channel-shaped track 1 and are mounted on the trolley by means of low-friction bearings. The chain 4 is attached to the trolleys by means of lugs 14 and this chain (shown chain-dotted in FIGURE 3) serves to drive the sprocket 7, mounted on an axle 15. On each trolley is located the sail 3 which is rotatable about an essentially vertical axis and mounted on a mast 16. The angle of the sail to the wind is altered by rotational movement of the mast 16 about a vertical axis. This movement is controlled by means of the mechanism of which the essential elements are shown in the plan view of the trolley in FIGURE 3.

This mechanism consists essentially of a series of profiled cams 17 which are mounted on a common shaft 18 and the shaft is driven by a distance wheel 19 or other mechanism as the trolley moves around the track. A series of cam followers 20 and solenoids 21 are arranged so as to be co-operable with each of the profiled cams 17 and these cam-followers and solenoids are mounted on a hollow tube 22 which is rotatable about a horizontal axis and is pivotably attached by means of bearings to the trolley framework. Rotational movement of the tube 22 about its horizontal axis is transmitted via a mechanical linkage 23 to a hydraulic cylinder 24 forming part of a hydraulic circuit which, by means of further mechanical linkages, controls the angle of the sail 3 to the wind. The control circuit which will be described in more detail hereafter is triggered by the switches actuated by the selector switch 9 which is shown in FIGURE 1.

With reference to FIGURE 5, the control circuit used to alter the angle of the rails is shown in more detail. One of the solenoids 21 is actuated by means of the switching mechanism 9, 10 of FIGURE 1 and the corresponding cam follower 20 is caused to become engaged with the appropriate profiled cam 17. The engagement of the cam follower 20 with the cam 17 causes limited rotational movement of the tube 22 to which the set of solenoids and cam followers are attached. This rotational movement of the tube is transmitted via the mechanical linkage 23 to a sleeve 25 which is adapted to move back and fore within the cylinder 24.

The interior of sleeve 25 is filled with a hydraulic fluid which is supplied to the sleeve 25 from a reservoir 26 by means of a pump 27, with the fluid being driven in the direction shown by the arrows in FIGURE 5. Lateral movement of the sleeve 25 causes ports 28 in the walls of the sleeve to be uncovered by the lands on piston 29. This causes a flow of hydraulic fluid to occur from the sleeve 25 into a secondary cylinder 30. This causes alteration of the position of a piston 31 within the cylinder 30, and this movement is transmitted via a mechanical linkage 32 to the mast carrying the sail, and causing rotational movement of the mast and adjustment of the angle which the sail 3 presents to the wind. This change of angle causes actuation of a mechanical linkage 33 which in turn causes movement of the piston 29 within the sleeve 25 until the lands of piston 29 cover the ports 28 in sleeve 25 thus forming a "hydraulic lock" and preventing further rotational movement of the sail until a change of wind occurs.

The actuation of the appropriate solenoid may be achieved by various means, either mechanical or electrical. In the embodiment shown in the drawings the trigger mechanism 10 consists of a number of lights mounted one above another on a mast alongside the track. When the wind changes, the selector switch 9 swings around causing an electrical connection to be made, lighting up the corresponding light. The light activates a corresponding photocell in a battery of cells 34 positioned vertically above one another on the trolley (see FIGURE 2). Actuation of this cell causes actuation of the corresponding solenoid, resulting in contact between the cam follower and cam. The device then functions as described above.

Various modifications may be made within the scope of the invention. Thus the solenoid actuation may be by mechanical or electrical means, by means of electrical or mechanical contacts mounted inside the track. In addition, the method of driving the cam shaft may be by means of a star wheel and striker instead of using the distance wheel 19 which is shown in FIGURES 3 and 4. This arrangement is shown in FIGURES 6 and 7. A star wheel 35 is mounted on the end of the cam driving shaft 18 as shown. A series of horizontal strikers 36 are mounted on posts around the inside of the track, and the star wheel is moved around by one spoke each time it encounters a striker. Normally strikers will be located at say 5 positions around each curve in the track so that the cam shaft is only driven by the star wheel on the curves. In this way the driving of the cam shaft is restricted to those parts of the track where there is a change of direction.

The whole of the trolleys and associated equipment should be of light weight construction and antifriction bearings should be used wherever possible to minimize the frictional forces to be overcome as the trolleys are driven around the track by the wind.

The trolleys may be mounted on a monorail, although a double track has been shown in the drawings.

I claim:

1. A device for harnessing wind energy, comprising a track defined by a closed circuit, a plurality of trolleys mounted for movement along the track, means pivotally connecting the trolleys together, a rotatable mast on each trolley, a sail mounted on each mast, and means operably related to a number of points along the track and to the masts for automatically rotating the masts and adjusting the angle which the sail presents to the wind at each of the points.

2. The device for harnessing wind energy as claimed in claim 1 in which said last named means includes a weather-vane type selector switch responsive to the direction of the wind connected to said number of points.

3. The device for harnessing wind energy as claimed in claim 1 in which last named means includes a series of profiled cams rotatably mounted on each trolley, means for imparting rotation to said profiled cams, a series of cam followers and solenoids mounted on each trolley cooperable with said profiled cams whereby actuation of one of the solenoids by one of the points effects the engagement with the corresponding cam follower with the appropriate profiled cam and linkage means imparting such movement to the rotatable mast.

4. The device for harnessing wind energy as claimed in claim 3 in which said profiled cams are mounted on a common shaft extending transversely of the trolley and a wheel carried by said shaft constitutes the means for rotating said shaft, a tube extending transversely of the trolleys and rotatable relative thereto, a piston and cylinder unit operably connected to said rotatable tube and said mast whereby rotary movement of the tube effects rotary movement of the mast.

5. The device for harnessing wind energy as claimed in claim 4 in which the signal to the solenoids is effected via photoelectric means.

6. The device for harnessing wind energy as claimed in claim 3 including a shaft extending transversely of the trolley to which said profiled cams are secured, and a star wheel attached to said shaft and actuated by strikers positioned at a series of points around the track constitutes the means for rotating the profiled cams.

7. The device for harnessing wind energy as claimed in claim 6 in which said strikers are located only on curves in the track.

References Cited

UNITED STATES PATENTS

| | | | |
|---|---|---|---|
| 1,025,399 | 5/1912 | Holmström | 170—138 |
| 2,346,595 | 4/1944 | Manning | 170—138 |
| 3,442,492 | 5/1969 | Sullivan | 230—59 X |

EVERETTE A. POWELL, JR., Primary Examiner

U.S. Cl. X.R.

170—6